July 20, 1965 S. E. TAYLOR 3,196,453
EYE MOVEMENT CAMERA
Filed May 28, 1959 8 Sheets-Sheet 1
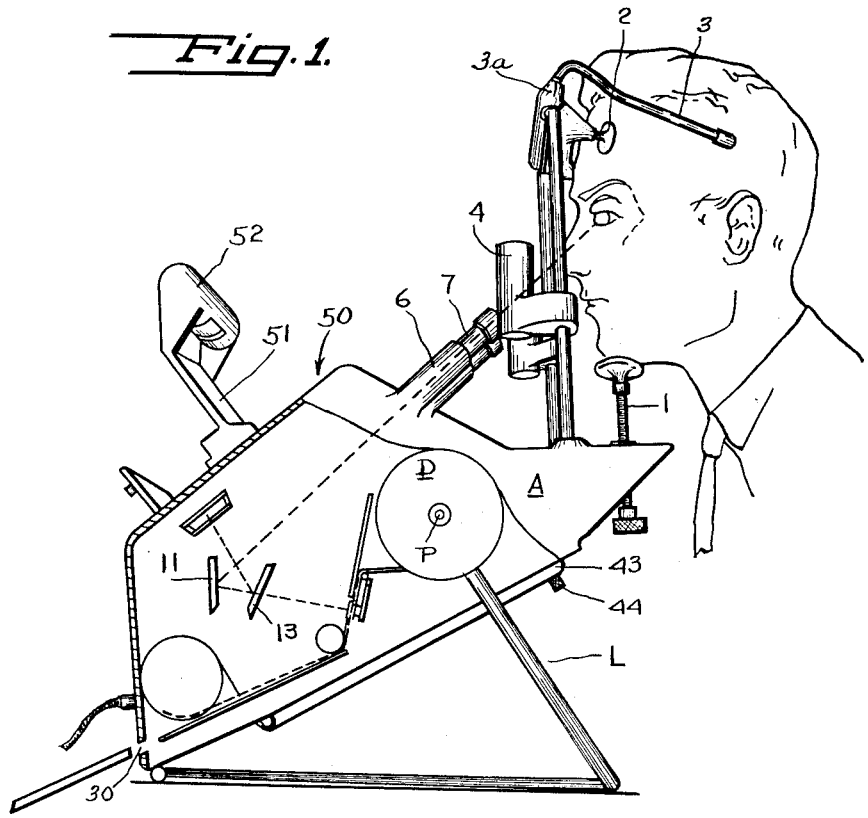
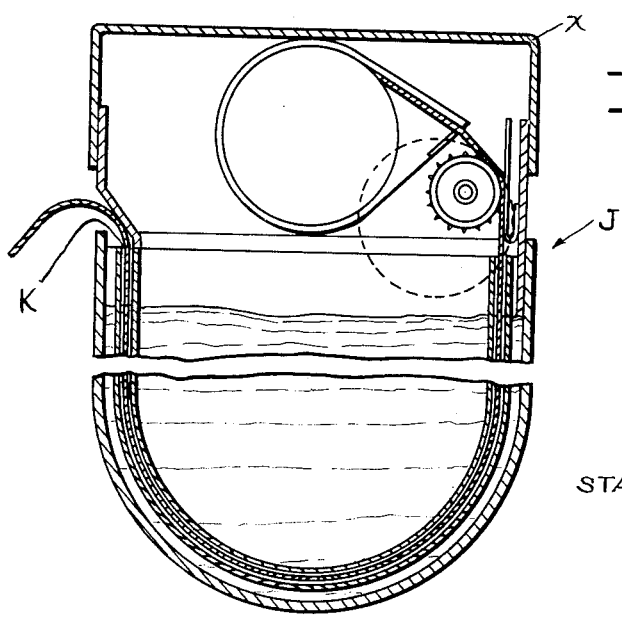
INVENTOR.
STANFORD E. TAYLOR
BY
Raymond A. Paquin
ATTORNEY.

July 20, 1965  S. E. TAYLOR  3,196,453
EYE MOVEMENT CAMERA
Filed May 28, 1959  8 Sheets-Sheet 2

INVENTOR.
STANFORD E. TAYLOR
BY
Raymond A. Paquin
ATTORNEY.

INVENTOR.
STANFORD E. TAYLOR
BY
Raymond A. Paquin
ATTORNEY.

INVENTOR.
STANFORD E. TAYLOR

July 20, 1965  S. E. TAYLOR  3,196,453
EYE MOVEMENT CAMERA
Filed May 28, 1959  8 Sheets-Sheet 7

INVENTOR.
STANFORD E. TAYLOR
BY
Raymond A. Paquin
ATTORNEY.

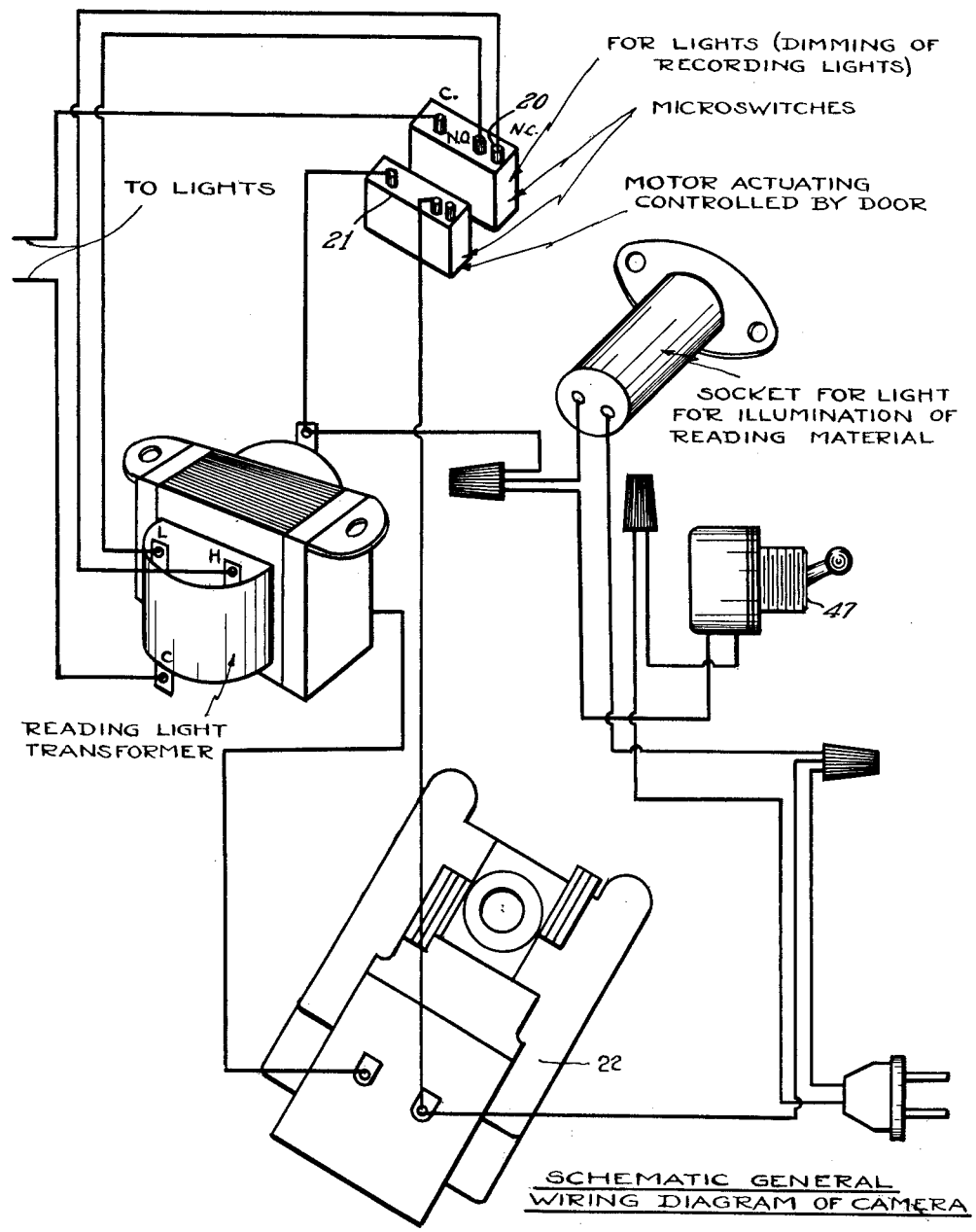

United States Patent Office 3,196,453
Patented July 20, 1965

3,196,453
EYE MOVEMENT CAMERA
Stanford E. Taylor, 33 Sunset Lane, Levittown, N.Y.
Filed May 28, 1959, Ser. No. 816,584
2 Claims. (Cl. 351—7)

This invention relates to new and useful improvements in eye movement cameras and has particular reference to a new portable, binocular eye movement camera designed to record the saccadic movements and pauses of the eyes during the reading process to make possible observation of the habits and skills of the reader through a study of the number, character and peculiarities of the eye movements and the pattern they compose.

An object of the invention is to provide an apparatus of the type set forth in which a comfortable position is provided for the reader with a natural viewing angle for reading and wherein elevating mechanism is provided for allowing quick adjustment for readers of varying heights.

Another object is to provide a device of the type set forth wherein the reader's awareness of the camera is at a minimum because of open design and low silhouette and wherein the recording lights dim when photography starts, thus reducing the reader's awareness of them and allows the use of brighter beams of light for focussing and alignment of the beams.

Another object is to provide a device of the type set forth with a new and improved identification system for identifying each individual graph.

Another object is to provide a new and improved self-threading arrangement for the film mechanism of a device of the type set forth.

Another object is to provide a new and improved optical system and mounting arrangement therefor which simplifies the use of the apparatus by the operator.

Another object is to provide a new and improved film loading arrangement for a camera of the type set forth.

Another object is to provide a device of the type set forth wherein the reading material is well illuminated to insure legibility and wherein the reading material support is removable so that the reading distance can be varied for subjects whose lens correction is not adequate.

Another object is to provide a device of the type set forth which is of relatively small size, compact and portable.

Other objects and advantages of the invention will be apparent from the following description taken in connection with the accompanying drawings.

Referring to the drawings:

FIG. 1 is a schematic view illustrating an apparatus embodying the invention;

FIG. 10 is a sectional view of the film processor for use with the apparatus;

FIG. 13 is a schematic view illustrating a general wiring diagram of the camera.

Figure 2:
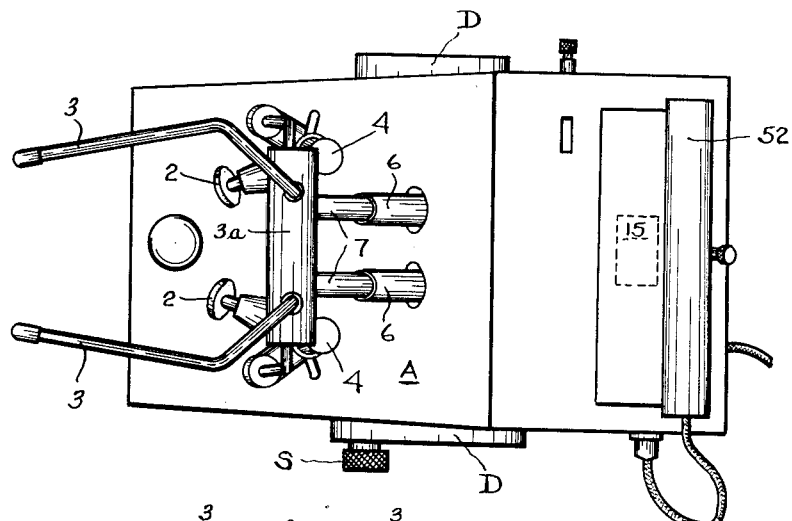
FIG. 2 is a top or plan view thereof.
Figure 3:
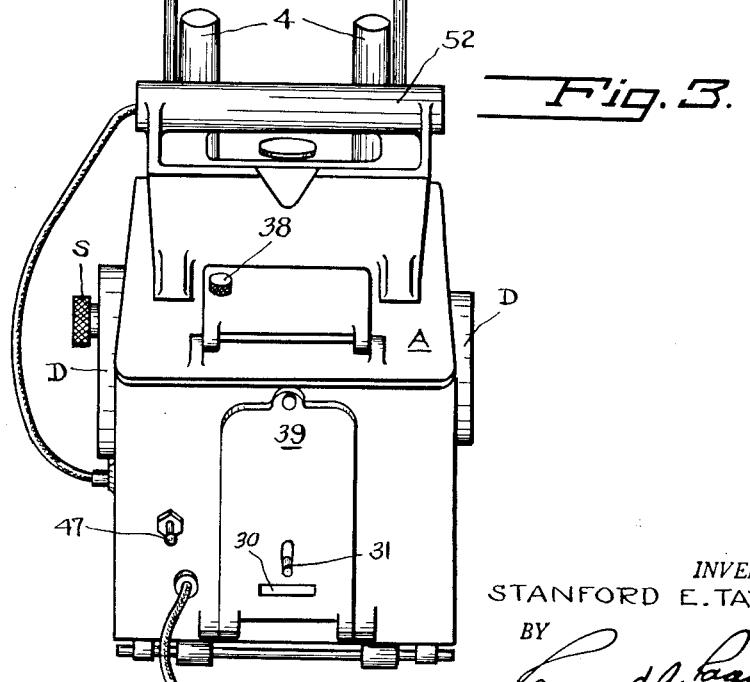
FIG. 3 is a rear view thereof.
Figure 4:
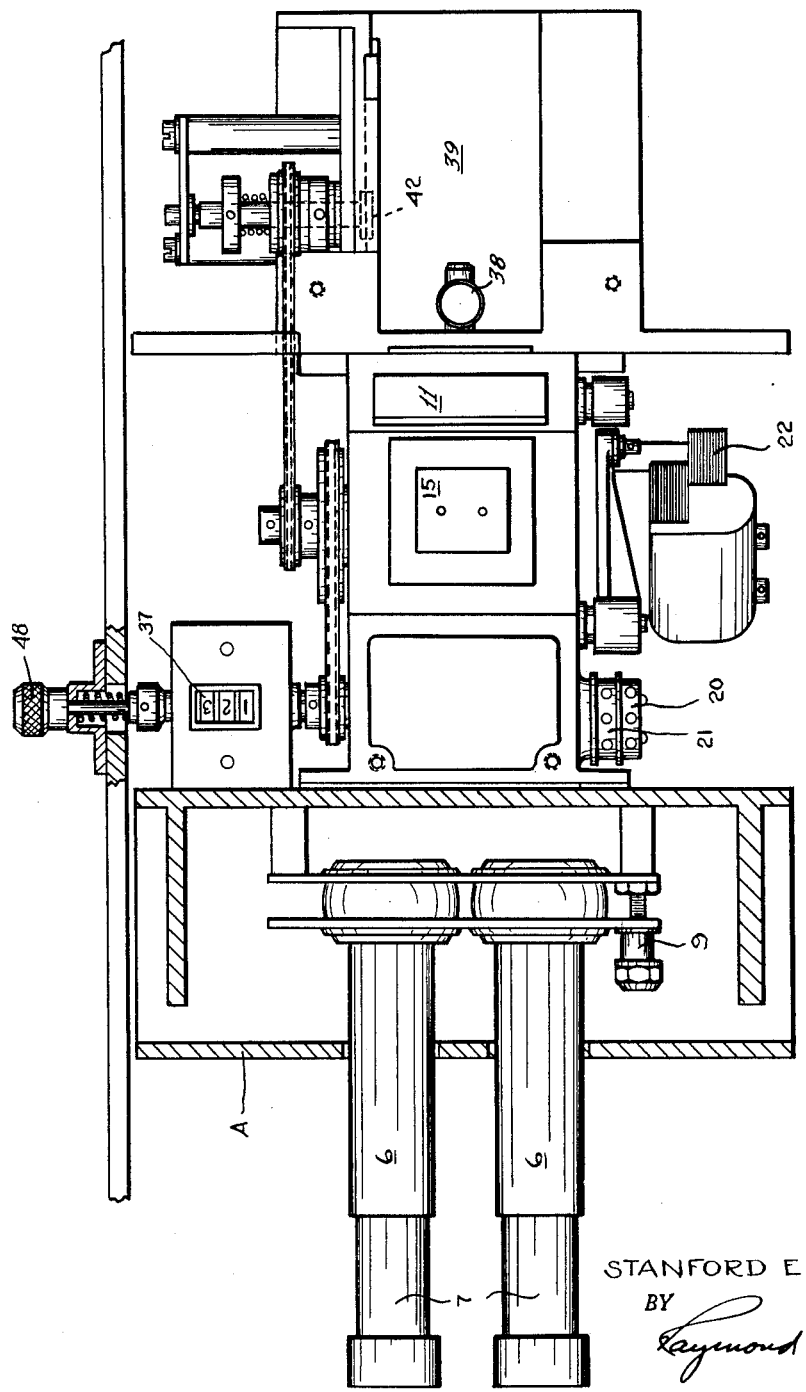
FIG. 4 is a fragmentary top view of the apparatus with the cover removed.

Referring more particularly to the drawings wherein similar reference characters designate corresponding parts throughout, the apparatus shown comprises a casing A on which is positioned a chin rest 1 which is vertically adjustable and which swivels on a ball and socket connection 1a on the casing A, and the forehead of the subject rests against head rest pads 2 which also swivel on ball and socket mountings and the head rest steadiers 3 engage the sides of the subject's head to discourage head movement. The head rest steadiers are pivotally mounted on support 3a and are friction loaded to retain their settings.

The recording lamps 4 emit light through lamp housing apertures 5 and the filaments of the lamps 4 form beads on the corneas of the eyes of the subject.

The examiner swings or adjusts the telescoping lens tubes 6 which are connected by ball and socket connections, to align the light beams from the eyes of the subject for photography and adjusts the telescoping lens tubes 7 in order to focus the lens system so that the light beams will be focused sharply and distinctly for photography. The telescoping lens member 7 is held in place in adjusted position by means of a detent 8 and the swiveling lens tube 6 holds its set position because of friction loading on the balls exerted by the compression of rubber washers 9. The light beams pass through the lens 10 and are reflected by mirror 11 either down onto the film passing by aperture 12 or onto mirror 13 to be reflected upward onto the ground glass 15 in the reflex aperture 14.

On the upper side of the casing A is provided the holder 51 for holding the material to be read during the eye movement photography, which material is illuminated by reading light 52.

Prior to photographing of the eye movements, the examiner aligns the light beads within the recording area 15 on the reflex aperture 14 and places the beads within the circles in the center of the recording area, and to start recording, the examiner shuts the reflex aperture door 16 and turns the cam lock 17 to secure the door. This depresses pin 18 against spring 19 which simultaneously swings mirror 13 out of position, allowing the beads to fall directly on the film to be recorded; actuates miniature micro switch 20 which dims the recording lights and actuates miniature micro switch 21 which starts the film drive motor 22.

The beads thus falling within the recording aperture 12 expose the film as it is driven from the supply spool 23 around roller 24 and under platen pressure plate 25 which is spring loaded to keep the film flat. The film is driven at a constant rate of one inch every two and one half seconds, or other suitable speed, by synchronous motor 22 which drives metering sprocket 26. The film is driven through a channel into take-up magazine 27. As the film enters the magazine, the core 28 constantly rotates in a counterclockwise direction and wiper arm 29 which is pivotally connected to core 28 or shaft 28a at 28b, picks up and hooks the film, drawing it into a tight circle around core 28.

Figure 5:
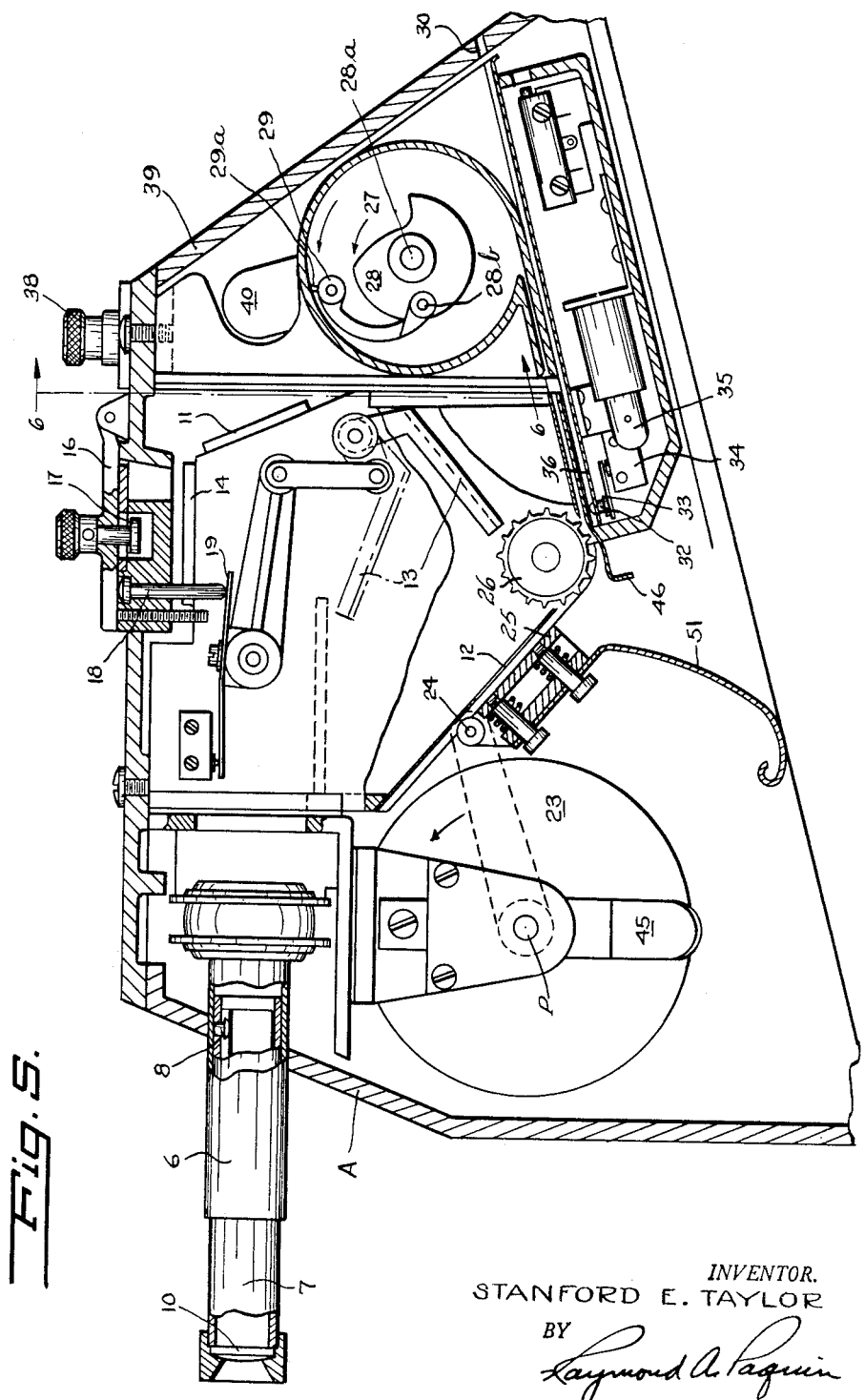
FIG. 5 is a side view of the apparatus with the cover removed.
Figure 6:
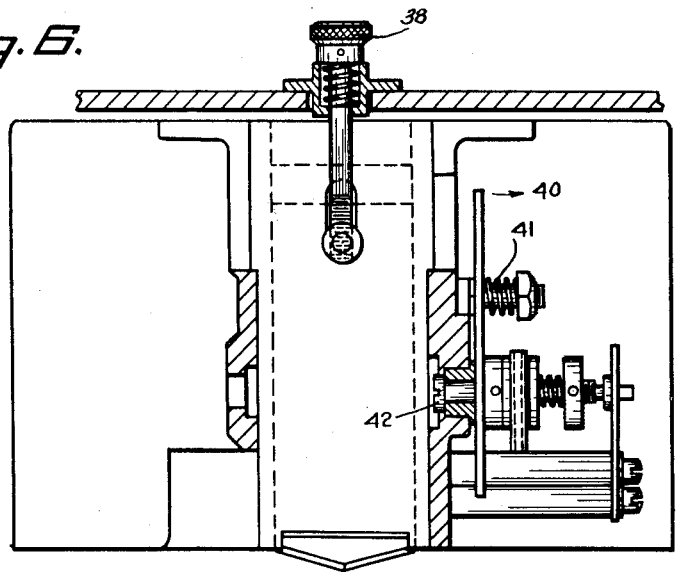
FIG. 6 is a sectional veiw taken on line 6—6 of FIG. 5, looking in the direction of the arrows.

In FIG. 5, the wiper arm 29 is shown with pins 29a adapted to enter the film notches to draw the film along. Instead of pins 29a, other forms of film contacting means may be employed particularly for use with film without notches.

After each eye movement photograph is taken, the subject's sequence number and/or initials, or other identification, can be recorded on film by writing with a grease pencil on a transparent plastic ruler called the I.D. marker and inserting this marker into entrance 30 after opening light-block door 31, and when the marker is pushed to the end of the channel it raises detent 32 which actuates spring 33, which in turn actuates micro switch 34, discharging the condenser flash system.

The casing A containing the camera is adapted to be supported on a table top or the like and held in adjusted angular relation thereon. To adjust the angular relation of the camera on the casing, there is provided the discs D pivotally connected to the casing A on each side thereof on the pivots P adjacent the end of the casing having the chin rest 1, and at least one of the discs D is adapted to be locked in adjusted position by means of screw or nut S on a bolt which extends through cam slot T in one of the discs D and which set screw or nut S may be loosened to allow the adjustment of the disc and then tightened to lock the disc in adjusted position. The U shaped legs L are provided with the upper end of the legs connected to the disc D, which U shaped legs L form the support for supporting the end of the camera at desired height relative to the table whereby the subject views the reading material at substantially the normal reading angle.

This flash system is an adjustable pulse of light that is neither a sustained light nor a repetitive flash. The unit is designed so that as to not recharge until the I.D. marker is removed, allowing the micro switch to reset. The circuit consists of a silicon or other suitable type of rectifier, the silicon type is preferred for compactness, and a network of three resistors. The center resistor is adjustable. The value is so selected that the output can be varied from 68–80 volts.

Figure 8:
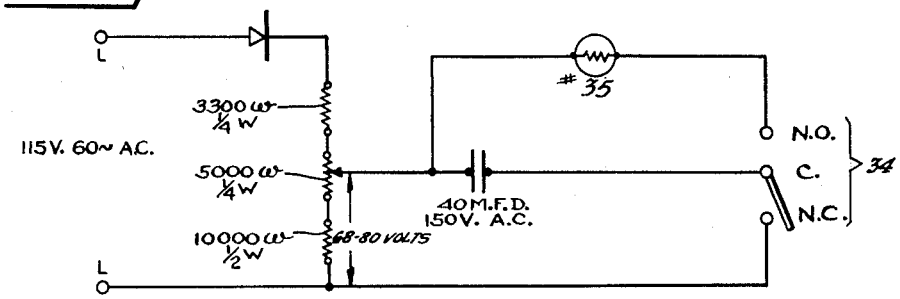
FIGS. 8 and 9 are wiring diagrams of the electrical systems of the apparatus.

The miniature micro switch which is shown in FIGURE 8 actuates the pulse, is connected through its normally closed contact to a condenser and to the network which charges the condenser to a selected D.C. value. When the micro switch is tripped by the I.D. marker, the total energy stored in the condenser is discharged through the pilot lamp 35 and at this point the condenser and pilot lamp 35 are both disconnected from the rectified power supply network and cannot recharge or relight until the I.D. marker is removed, switching the condenser back to recharge position.

Thus the lamp 35 exposes the identification markings through aperture 36 onto the film before it passes into cartridge 27.

After one or more eye movement photographs is taken (up to twenty-five feet of film or more or less, as indicated on counter 37) the take-up magazine can be removed by pressing down cutter button 38 which parts the film, then opening door 39, disengaging the clutch drive from the take-up magazine by pushing lever 40 towards the right and then withdrawing the magazine. To re-insert an empty magazine, the procedure is reversed. When lever 40 is released, spring 41 will cause the clutch plate 42 to engage with the take-up magazine.

The friction clutch as shown in the drawing consists of metal members separated by friction material such as cork impregnated in neoprene, spring loaded in such a manner as to be able to vary the point of slippage so that the wiper arm 29 will travel many times faster than the rate of the film entering the mazazine and yet when the film is hooked by arm 29 and wrapped into a tight circle around core 28 of the magazine, it commences to slip (the diameter of the core being larger than the diameter of metering sprocket 26).

When it is necessary to reload the camera, a new supply spool 23 containing a substantial amount of film can be inserted by opening door 43 by unlocking knob 44 and then pushing aside lever 45. Upon releasing lever 45, an engaging pin snaps into the supply spool, locking it in place. The film is then inserted between metering sprocket 26 and film shoe 46 with the motor running. The platen pressure plate is then swung into position, pressing film against aperture. The platen is held against the film by the pressure of spring 51 which is held in place when door 43 is closed. After the film is loaded, the footage counter is reset by turning knob 48 counterclockwise to zero.

Figure 9:
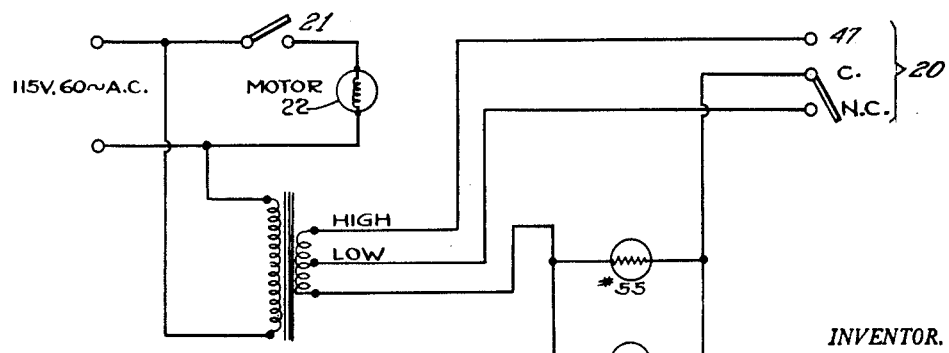
Figure 7:
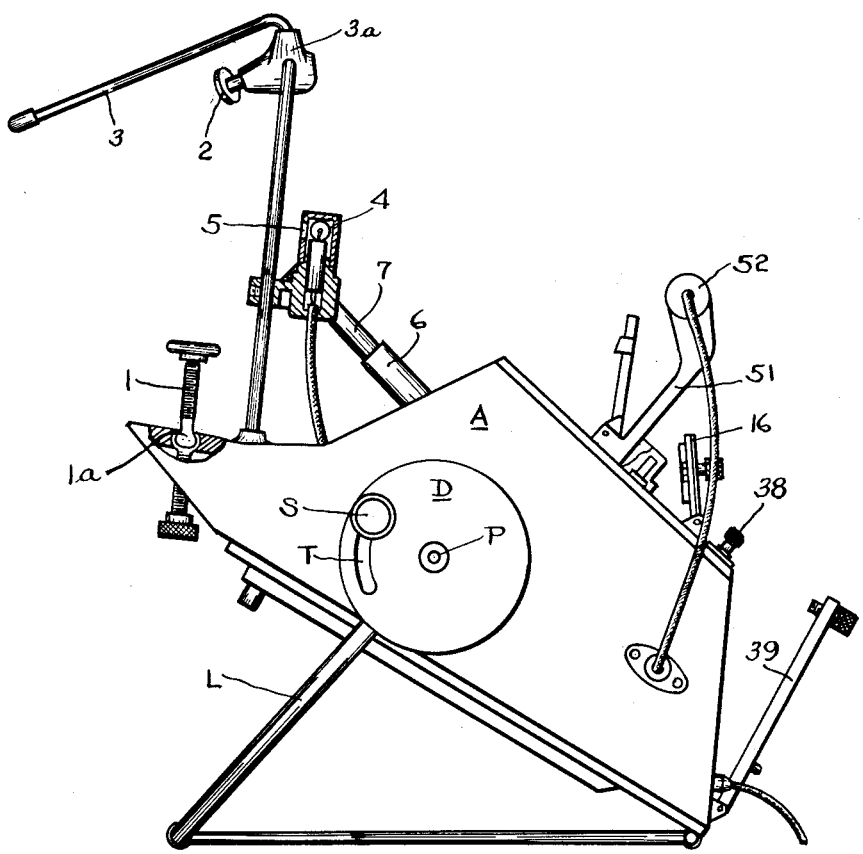
FIG. 7 is a side view of the apparatus.

Switch 47 which is shown in FIGURE 9 is the master switch controlling the circuit to the reading lamp, the I.D. flasher, the recording lights and the drive motor and, thus when switch 47 is turned on, the reading light and the recording lights are on continuously. The drive motor and the diming of the recording lights is actuated by the closing of the aperture door and the flasher unit is actuated by the insertion of the I.D. marker.

The reading material is inserted into card holder 49 which also contains the reading lamp 52. The reading material is covered during the alignment of the beads by target card 50. Once the beads have been aligned and the aperture door has been closed to start recording, the target card is lowered so that to lie flat on top of the camera allowing the reading selection to be read by the subject.

The film in the take-up magazine is developed in a companion processor J which consists of a single tank X containing a U shaped channel into which the film K is driven and holding a single solution develop-fixer.

This unit is designed to develop the film automatically in the single solution developer and and through the use of this automatic unit the film can be processed while the examiner continues to take additional eye movement photographs.

The take-up magazine M is inserted into the processor J as shown in FIG. 10 with approximately two inches of leader film entering beyond the mouth or lips of the magazine and this leader is then inserted between the sprocket S and the retaining spring C. The cover X of the processor is placed over the magazine and sprocket and the motor is started whereby the film is driven through the solution at a suitable rate and exits through the port D. It is pointed out that the rate of development is faster than the photographing time.

It will be noted that the ball and socket lens tube mounting provides for far greater ease and speed in locating and focussing the light beads on the subject's eyes and with the optical system shown, the light beads appearing on the reflex area 15 travel in the same direction as the movement of the lens tube, thus making the alignment of the light beads a simpler task for the operator.

It will be seen that with the arrangement shown, brighter light beads may be used during the focussing and alignment of the light beads on the subject's eyes, but during recording, however, when the subject is actually reading, the lights dim, diminishing the possibility of their brilliance influencing the subject's reading performance.

Figure 11:
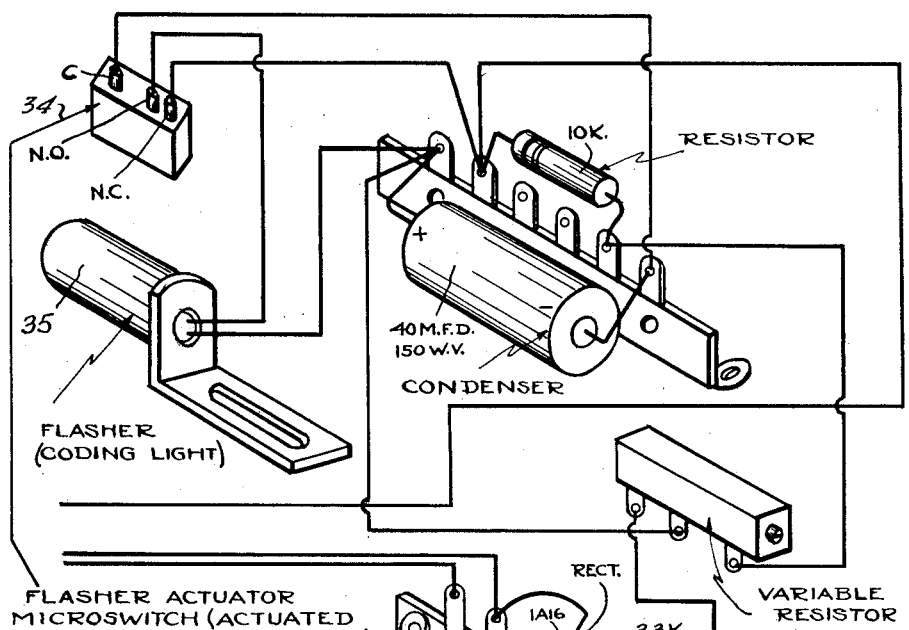
FIG. 11 is a schematic view of the flasher assembly and wiring.
Figure 12:
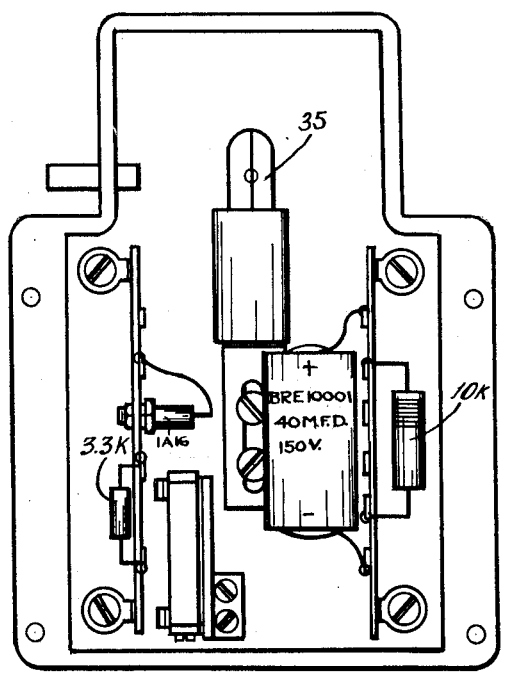
FIG. 12 is a view of the flasher assembly mounted in the casing, but with the cover removed.

It will be seen that with the identification flasher system shown, which arrangement is shown schematically in FIG. 11 and in assembled relation in FIG. 12, that simple and direct means is provided for recording a sequence number and initials on each graph and, in addition, the exposure can be regulated so that the identification can be superimposed directly on the recording, rather than on the preceding or following the graph.

It will be seen that after the film is cut off and a magazine removed, the film will re-enter the new magazine automatically and will be wound automatically and with the film cutting blade or knife built into the camera, it allows excess film to be cut off whether or not a magazine is in the camera and also permits the examiner to increase the size of the leader by partially withdrawing the magazine before cutting the film, and the take-up magazine allows for easy and automatic extraction of the film into the developing unit.

The operation of the device is believed apparent from the foregoing description from which it will be seen that I have provided new and improved means for obtaining all of the objects and advantages of the invention.

I claim:

1. A camera for photographically recording the movements of the eyes of a subject during the reading process comprising: a camera casing assembly having adjustable means for engaging the subject's head to maintain the camera and head in relatively stable relationship relative to each other; a bracket mounted on said casing for supporting reading material in the line of vision of the subject; light source means for directing two separate light beams so as to impinge on the two eyes of the subject; film feeding and guiding mechanisms mounted inside said casing and including a film exposure area and a motor and sprocket for feeding photographic film past the exposure area at a predetermined speed; an optical system including a pair of lens tubes adjustably mounted in said casing and arranged so as to receive the light beams reflected from the subject's eyes and project them into the casing onto the photographic film in the exposure area; a reflex viewing screen mounted in the wall of said casing; light directing means mounted inside said casing and shiftable between a film exposing position outside of the path of the light beam and a focusing position outside in the path of the light beam so as to direct the light beam away from the exposure area to the reflex area; switch means for causing the operation of the film feeding motor and for causing the dimming of the light to a lower projection intensity from a higher focusing intensity; and a cover for said reflex screen shiftable between open and closed positions and connected to the light directing means and the switch means so as to shift the light directing means to film exposing position so as to cause the operation of the film feeding motor and dimming of the light source to a power projection intensity when the cover is shifted to close position and to cause the stopping of the film feeding motor and brightening of the light source when the cover is shifted to the open position.

2. A camera for photographically recording the movements of the eyes of a subject during the reading process as set forth in claim 1 which includes mechanism for identifying the photographic film sequences comprising a card receiving opening and guide formed in the case adjacent the film feeding guide means for receiving an identifying card, a light source positioned inside the casing adjacent said opening and guide, a switch for operating the light source, and switch operating means adjacent said card receiving opening and guide in the path of movement of an identifying card inserted therein to cause the operation of the light source and the exposure of the identifying card on the film.

References Cited by the Examiner
UNITED STATES PATENTS

| | | |
|---|---|---|
| 1,132,808 | 3/15 | Tuttle. |
| 1,473,264 | 11/23 | Vaughan _____ 248—133 |
| 1,747,431 | 2/30 | Ellwood _____ 88—16 |
| 2,006,007 | 6/35 | Zimmer. |
| 2,084,162 | 6/37 | Packard _____ 248—139 |
| 2,135,817 | 11/38 | Hughey. |
| 2,229,721 | 1/41 | Brandt _____ 88—20 |
| 2,237,737 | 4/41 | Houston _____ 242—71.1 |
| 2,255,689 | 9/41 | Taylor et al. _____ 88—20 |
| 2,487,479 | 11/49 | Roehrl _____ 242—71.1 |
| 2,557,608 | 6/51 | Mast et al. _____ 248—123 |
| 2,868,069 | 1/59 | Elmore _____ 88—24 |
| 3,016,000 | 1/62 | Noyori _____ 88—20 |

JEWELL H. PEDERSEN, *Primary Examiner.*
EMIL G. ANDERSON, *Examiner.*